United States Patent Office.

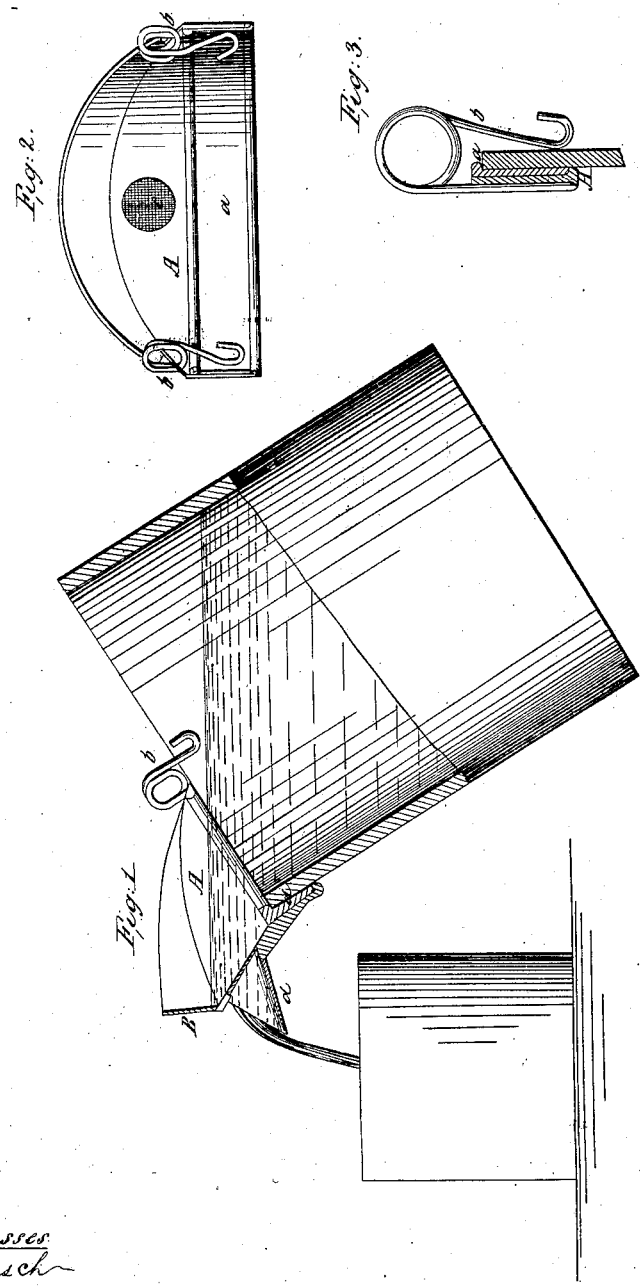

IMPROVED MILK-STRAINER.

N. A. WRIGHT, OF PRAIRIE DU CHIEN, WISCONSIN.

Letters Patent No. 59,885, dated November 20, 1866.

SPECIFICATION.

TO ALL WHOM IT MAY CONCERN:

Be it known that I, N. A. WRIGHT, of Prairie du Chien, in the county of Crawford, and State of Wisconsin, have invented a new and improved Milk-Strainer; and I do hereby declare that the following is a full, clear, and exact description thereof, which will enable others skilled in the art to make and use the same, reference being had to the accompanying drawings forming a part of this specification, in which—

Figure 1 represents the strainer attached to a pail as used, in sectional view.

Figure 2 is a back view of the strainer detached.

Figure 3 is a cross-section of the same.

Similar letters of reference indicate like parts.

This invention relates to a new and improved device for straining milk or other liquids, and consists in a detached spout, made with a rubber or other yielding lining to fit close around the edge of a pail or bucket, to which it may be attached by means of springs, which are slipped readily over the side of the pail and press the lining against it while the milk is poured out and strained. It is a simple, cheap, and convenient device, particularly adapted to the use of farmers and dairymen. The body of the strainer is formed of tin or other metal plate, the lower section, A, being bent into a segment to fit the periphery of a pail or bucket, as shown in fig. 1. In the inside of the segment, A, is fastened a rubber or other yielding, elastic lining, a, which is made to fit closely against the outside and upper edge of the pail to prevent the milk or other fluid from spilling when it is poured out for straining, and on the ends of the segment, A, are placed springs, b b, which are made to slip easily over the side of the pail and hold the strainer in place upon it, bearing the lining, a, close against the edge for the purpose above stated. The upper section, B, of the strainer is made to set back nearly at a right angle to the lower part, A, to which it is soldered, thus forming a guard to prevent the milk from spilling when the pail is tipped up to strain the milk. In the middle of the lower section, A, a hole, C, of any proper shape and size, is made with a wire gauze, mohair, or other suitable fabric for straining milk or other fluids, outside of which hole is affixed a nozzle or spout, d, for pouring the strained liquid into a receptacle, as shown at fig. 1. In the arrangement of the springs for securing the strainer to the pail I do not confine myself to the precise method described.

Having thus described my invention, what I claim as new, and desire to secure by Letters Patent, is—

The combination of the rubber or other elastic lining, a, on the inside of a lower section, A, of a strainer with the springs b b, arranged substantially as herein shown and described.

N. A. WRIGHT.

Witnesses:
 F. B. BATCHELDER,
 WM. A. TERRY.